(12) United States Patent
Yoshinaga

(10) Patent No.: US 11,278,868 B2
(45) Date of Patent: Mar. 22, 2022

(54) WATER ABSORPTION TREATMENT MATERIAL AND METHOD FOR MANUFACTURING THE SAME

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 929 days.

(21) Appl. No.: 15/896,858

(22) Filed: Feb. 14, 2018

(65) Prior Publication Data

US 2018/0169618 A1 Jun. 21, 2018

Related U.S. Application Data

(63) Continuation of application No. PCT/JP2016/080994, filed on Oct. 19, 2016.

(30) Foreign Application Priority Data

Nov. 19, 2015 (JP) .............................. JP2015-226260

(51) Int. Cl.
| | | |
|---|---|---|
| *B01J 20/00* | (2006.01) | |
| *B01J 20/28* | (2006.01) | |
| *A01K 1/015* | (2006.01) | |
| *A01K 23/00* | (2006.01) | |
| *B01J 20/32* | (2006.01) | |
| *C02F 1/28* | (2006.01) | |

(52) U.S. Cl.
CPC ......... *B01J 20/28042* (2013.01); *A01K 1/015* (2013.01); *A01K 23/00* (2013.01); *B01J 20/28019* (2013.01); *B01J 20/3206* (2013.01); *B01J 20/327* (2013.01); *B01J 20/3274* (2013.01); *B01J 20/3291* (2013.01); *B01J 20/3293* (2013.01); *C02F 1/288* (2013.01); *B01J 2220/485* (2013.01); *B01J 2220/4831* (2013.01); *B01J 2220/4875* (2013.01); *B01J 2220/4893* (2013.01); *B01J 2220/50* (2013.01)

(58) Field of Classification Search
CPC ...... B01J 20/3225; B01J 2/00; B01J 20/3212; B01J 20/3293; B01J 20/3274; B01J 20/28019; B01J 20/28054; B01J 2220/4831; A01K 1/015; A01K 1/0155; A61L 15/42
USPC ........................................................ 502/400
See application file for complete search history.

(56) References Cited

U.S. PATENT DOCUMENTS

2015/0181832 A1* 7/2015 Lipscomb ............ A01K 1/0152
119/171

FOREIGN PATENT DOCUMENTS

| JP | S54-049989 A | 4/1979 |
| JP | 2014-076408 A | 5/2014 |
| JP | 2015-097996 A | 5/2015 |

OTHER PUBLICATIONS

Feb. 19, 2019 Extended European Search Report issued in European Patent Application No. 16866082.

* cited by examiner

*Primary Examiner* — Haytham Soliman
(74) *Attorney, Agent, or Firm* — Oliff PLC

(57) ABSTRACT

A water absorption treatment material includes a core portion and a coating portion. The core portion is approximately circular column-shaped and has a side surface, a first bottom surface, and a second bottom surface. The coating portion is provided so as to cover the core portion. A region of 80% or more of the side surface of the core portion is covered by the coating portion. A region of 80% or more of the first bottom surface of the core portion is exposed without being covered by the coating portion.

3 Claims, 3 Drawing Sheets

WATER ABSORPTION TREATMENT MATERIAL AND METHOD FOR MANUFACTURING THE SAME

CROSS REFERENCE TO RELATED APPLICATION

This is a Continuation of International Application No. PCT/JP2016/080994 filed Oct. 19, 2016, which claims the benefit of Japanese Application No. 2015-226260 filed Nov. 19, 2015. The contents of these applications are hereby incorporated by reference in their entirety.

TECHNICAL FIELD

The present invention relates to a water absorption treatment material that absorbs a liquid, and a method for manufacturing the same.

BACKGROUND ART

Patent Document 1 describes an example of a conventional water absorption treatment material. The water absorption treatment material is provided with a core portion formed into a granular shape and a coating portion that covers the core portion. The coating portion has a function of adhering pieces of the water absorption treatment material together, which have absorbed liquid during use. Accordingly, a clump composed of multiple pieces of the water absorption treatment material is formed after use.

CITATION LIST

Patent Document
 Patent Document 1: JP 2015-97996A

SUMMARY OF THE INVENTION

Technical Problem

Thus, the coating portion contributes to forming a clump of the water absorption treatment material after use. However, on the other hand, since the coating portion is provided so as to cover the core portion, it inhibits the liquid from quickly reaching the core portion. This has caused the water-absorptivity to decrease in the conventional water absorption treatment material.
Solution to the Problem The present invention has been made in view of the foregoing circumstance and aims to provide a water absorption treatment material and a method for manufacturing the same, according to which it is possible to suppress a decrease in water-absorptivity caused by the existence of the coating portion.

A water absorption treatment material according to the present invention includes: an approximately circular column-shaped core portion having a side surface and first and second bottom surfaces; and a coating portion that covers the core portion, wherein a region of 80% or more of the side surface of the core portion is covered by the coating portion, and a region of 80% or more of the first bottom surface of the core portion is exposed without being covered by the coating portion.

With this water absorption treatment material, the majority (region of 80% or more) of the side surface of the core portion is covered by the coating portion, while the majority of the bottom surface is exposed without being covered by the coating portion. For this reason, the liquid can quickly reach the core portion through the exposed portion.

Also, a method for manufacturing a water absorption treatment material includes: a core portion forming step of forming an approximately circular column-shaped core portion having a side surface and first and second bottom surfaces; and a coating portion forming step of forming a coating portion so as to cover the core portion, wherein in the coating portion forming step, the coating portion is formed such that a region of 80% or more of the side surface of the core portion is covered by the coating portion and a region of 80% or more of the first bottom surface of the core portion is exposed without being covered by the coating portion.

With this manufacturing method, the coating portion is formed such that the majority of the side surface of the core portion is covered by the coating portion while the majority of the bottom surface is exposed without being covered by the coating portion. For this reason, with the manufactured water absorption treatment material, the liquid can quickly reach the core portion through the exposed portion.
Advantageous Effects of Invention According to the present invention, a water absorption treatment material and a method for manufacturing the same are realized, according to which it is possible to suppress a decrease in water-absorptivity caused by the existence of the coating portion.

DESCRIPTION OF EMBODIMENTS

Figure 1:
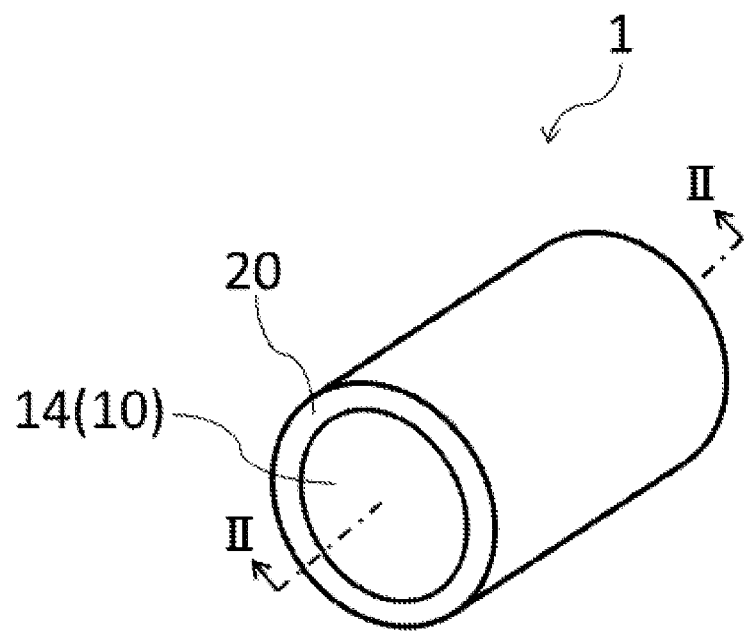
FIG. 1 is a perspective view showing an embodiment of a water absorption treatment material according to the present invention.

Hereinafter, an embodiment of the present invention will be described in detail with reference to the drawings. Note that in the description of the drawings, like elements are denoted by like reference numerals and redundant description thereof is not included.

Figure 2:
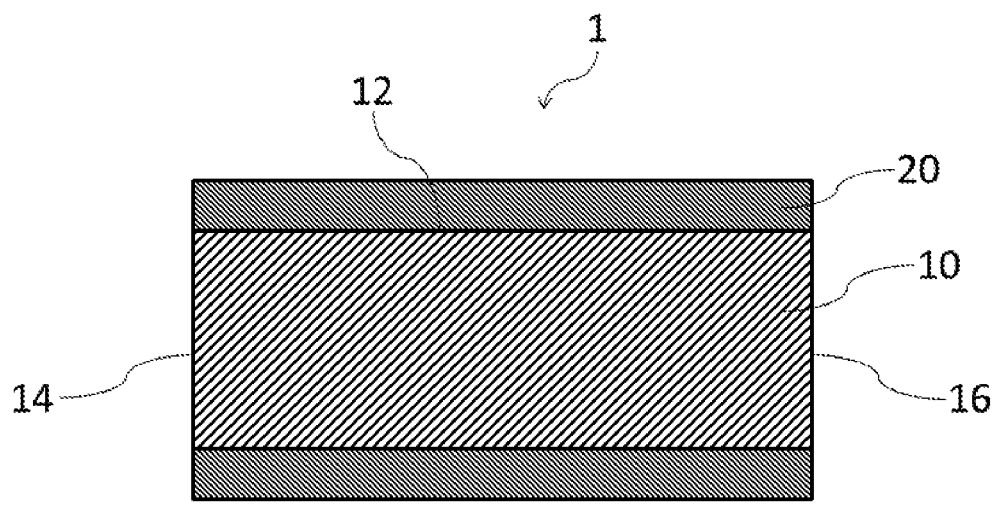
FIG. 2 is a cross-sectional view taken along line II-II in FIG. 1.

FIG. 1 is a perspective view showing an embodiment of a water absorption treatment material according to the present invention. Also, FIG. 2 is a cross-sectional view taken along line II-II in FIG. 1. A water absorption treatment material 1 is a water absorption treatment material that absorbs a liquid, and includes a core portion 10 and a coating portion 20. The water absorption treatment material 1 is an excrement treatment material that absorbs human or animal excrement, for example.

Figure 3:
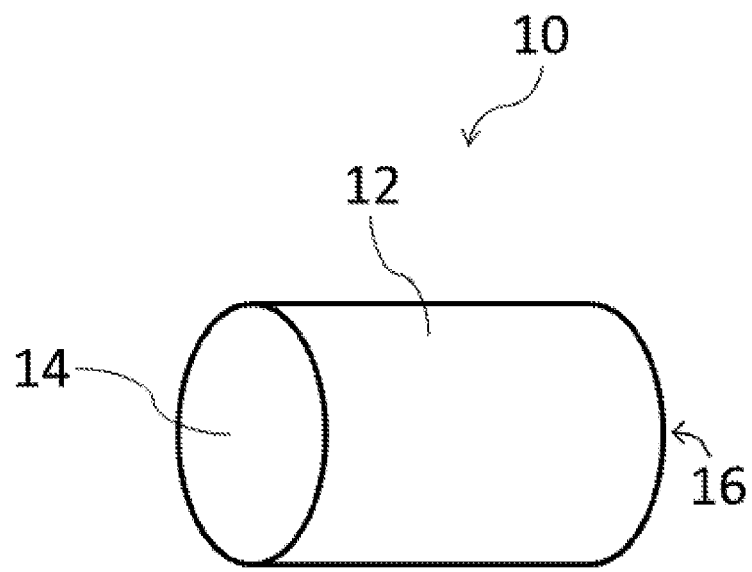
FIG. 3 is a perspective view showing a core portion of the water absorption treatment material shown in FIG. 1.

FIG. 3 is a perspective view showing the core portion 10. The core portion 10 is approximately circular column-shaped and has a side surface 12, a bottom surface 14 (first bottom surface), and a bottom surface 16 (second bottom surface). The core portion 10 is water-absorbent and has a function of absorbing and retaining liquids such as urine. The core portion 10 contains a water-absorptive material (first water-absorptive material). For example, paper, tea grounds, plastic, or bean curd lees can be used as the first water-absorptive material. The first water-absorptive material is preferably the main material of the core portion 10. Here, the main material of the core portion 10 refers to a material that has the largest weight ratio in the core portion 10 among materials constituting the core portion 10.

Paper refers to a material mainly composed of pulp. Examples of paper include classified vinyl chloride wallpaper (paper obtained by classifying vinyl chloride wallpaper), fluff pulp, papermaking sludge, and pulp sludge, in addition to normal paper. It is also possible to use classified paper diapers (plastic obtained by classifying paper diapers) as the plastic, for example. The bean curd lees are preferably dried bean curd lees.

Returning to FIGS. 1 and 2, the coating portion 20 is provided so as to cover the core portion 10. The coating portion 20 has a function of adhering pieces of the water absorption treatment material 1 together, which have absorbed liquid during use. Accordingly, a clump composed of multiple pieces of the water absorption treatment material 1 is formed after use.

The coating portion 20 covers only a portion of the core portion 10. Specifically, a region of 80% or more of the side surface 12 of the core portion 10 is covered by the coating portion 20. That is, the area of the portion of the side surface 12 that is covered by the coating portion 20 is 80% or more of the area of the entire side surface 12. It is preferable that a region of 90% or more of the side surface 12 is covered by the coating portion 20, and it is more preferable that the entirety of the side surface 12 is covered by the coating portion 20. FIGS. 1 and 2 show cases in which the entirety of the side surface 12 is covered by the coating portion 20. Note that the coating portion 20 is preferably provided continuously on the side surface 12. In other words, even if the coating portion 20 covers the side surface 12 excluding part (a region of 20% or less) of the side portion 12, it is preferable that the coating portion 20 provided on the side surface 12 is not divided into multiple locations but is continuous.

On the other hand, a region of 80% or more of the bottom surface 14 of the core portion 10 is exposed without being covered by the coating portion 20. That is, the area of the portion of the bottom surface 14 that is exposed without being covered by the coating portion 20 is 80% or more of the area of the entire bottom surface 14. It is preferable that a region of 90% or more of the bottom surface 14 is exposed without being covered by the coating portion 20, and it is more preferable that the entirety of the bottom surface 14 is exposed without being covered by the coating portion 20. FIGS. 1 and 2 show cases in which the entirety of the bottom surface 14 is exposed without being covered by the coating portion 20.

Similarly, a region of 80% or more of the bottom surface 16 of the core portion 10 is exposed without being covered by the coating portion 20. That is, the area of the portion of the bottom surface 16 that is exposed without being covered by the coating portion 20 is 80% or more of the area of the entire bottom surface 16. It is preferable that a region of 90% or more of the bottom surface 16 is exposed without being covered by the coating portion 20, and it is more preferable that the entirety of the bottom surface 16 is exposed without being covered by the coating portion 20. FIG. 2 shows a case in which the entirety of the bottom surface 16 is exposed without being covered by the coating portion 20.

Note that although unevenness and cracks are sometimes present in the side surface 12, such unevenness and the like is ignored when considering the area ratio of the portion covered by the coating portion 20. Specifically, it is sufficient to consider the area ratio on a circular tube surface when the side surface 12 is projected onto the circular tube surface having the same central axis as the core portion 10. The same applies to the bottom surfaces 14 and 16. That is, it is sufficient to consider the area ratio on a plane when the bottom surfaces 14 and 16 are projected onto the planes orthogonal to the central axis.

The coating portion 20 contains a water-absorptive material (second water-absorptive material) and an adhesive material. For example, paper, tea grounds, plastic, or bean curd lees can be used as the second water-absorptive material as well. The second water-absorptive material may be the same as or different from the first water-absorptive material. The second water-absorptive material is preferably the main material of the coating portion 20. The definition of the main material of the coating portion 20 is the same as the above-described definition of the main material of the core portion 10. For example, water-absorptive polymer, starch, CMC (carboxymethyl cellulose), PVA (polyvinyl alcohol), or dextrin can be used as the adhesive material.

Next, an example of a method for manufacturing the water absorption treatment material 1 will be described as an embodiment of a method for manufacturing a water absorption treatment material according to the present invention. The manufacturing method includes a core portion forming step and a coating portion forming step.

The core portion forming step is a step of forming the core portion 10. In this step, the core portion 10 is formed through extrusion granulation. Specifically, the material (core portion material) constituting the core portion 10 is pulverized to a predetermined size by a pulverizer, and thereafter is introduced into a mixer at a predetermined ratio and is mixed together. Then, water is added according to need, and thereafter the core portion material is subjected to extrusion granulation by a granulator. Accordingly, approximately circular column-shaped core portions 10 are obtained.

The coating portion forming step is a step of forming the coating portions 20 so as to cover the core portions 10. In this step, the coating portion 20 is formed such that a region of 80% or more of the side surface 12 is covered by the coating portion 20 and regions of 80% or more of the bottom surfaces 14 and 16 are exposed without being covered by the coating portion 20. At this time, it is preferable that a region of 90% or more of the side surface 12 is covered by the coating portion 20, and it is more preferable that the entirety of the side surface 12 is covered by the coating portion 20. Also, it is preferable that regions of 90% or more of the bottom surfaces 14 and 16 are exposed without being covered by the coating portion 20, and it is more preferable that the entireties of the bottom surfaces 14 and 16 are exposed without being covered by the coating portion 20. Note that in this step, it is preferable that a continuous coating portion 20 is formed on the side surface 12.

Figure 4:
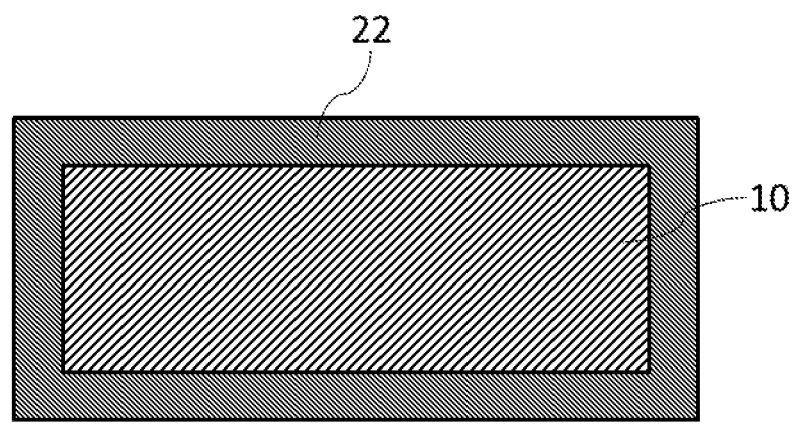
FIG. 4 is a cross-sectional view illustrating a coating portion forming step.
Figure 5:
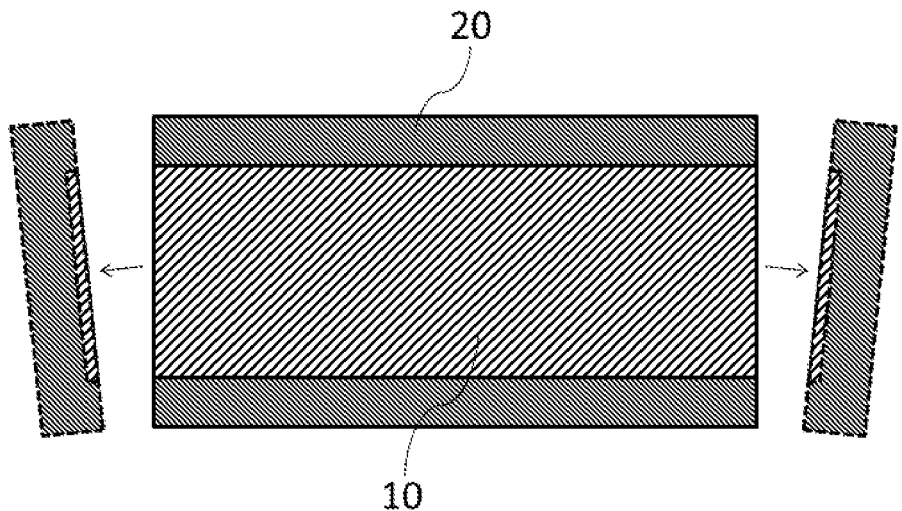
FIG. 5 is a cross-sectional view illustrating the coating portion forming step.

In the coating portion forming step, as shown in FIG. 4, a coating material 22, which is a material that constitutes the coating portion 20, is attached to the periphery of the core portion 10 (attachment step). At this time, the coating material 22 may be attached to the entirety or a portion of the periphery of the core portion 10. FIG. 4 shows a case in which the coating material 22 is attached to the entire periphery of the core portion 10. For example, a coating apparatus can be used to attach the coating material 22. After the attachment step, as shown in FIG. 5, the two end portions of the core portion 10 are cut off (cutting-off step). Thus, the coating portion 20 is obtained.

Thereafter, only granular bodies that satisfy a predetermined standard are extracted by sieving the granular bodies obtained in this manner (size separation step). Then, the extracted granular bodies are dried using a dryer (drying step). The moisture content of the core portions 10 is adjusted as appropriate through the drying. According to the above description, the water absorption treatment material 1 is obtained.

Effects of the present embodiment will be described hereinafter. In the present embodiment, the coating portion 20 is formed such that the majority (region of 80% or more) of the side surface 12 of the core portion 10 is covered by the coating portion 20 while the majority of the bottom surface 14 is exposed without being covered by the coating portion 20. For this reason, in the water absorption treatment material 1, the liquid can quickly reach the core portion 10 through the exposed portions. Accordingly, the water absorption treatment material 1 and the method for manufacturing the same, according to which it is possible to suppress a decrease in water-absorptivity caused by the existence of the coating portion 20, are realized.

Exposing the majority of the bottom surface 14 in this manner is advantageous for increasing the area of contact with the liquid of the core portion 10, whereby the water-absorptivity (in particular, the water absorption speed) of the water absorption treatment material 1 is improved. From this viewpoint, it is preferable that a region of 90% or more of the bottom surface 14 is exposed without being covered by the coating portion 20, and it is more preferable that the entirety of the bottom surface 14 is exposed without being covered by the coating portion 20.

Also, a configuration in which the coating portion 20 is provided on the majority of the side surface 12 is advantageous for sufficiently adhering the pieces of the water absorption treatment material 1 together, which have absorbed the liquid during use. Moreover, in the case of this configuration, the majority of the side surface 12, which tends to be more noticeable compared to the bottom surfaces 14 and 16, is covered by the coating portion 20, and therefore there is an advantage in that the aesthetics of the water absorption treatment material 1 are not impaired. From these viewpoints, it is preferable that a region of 90% or more of the side surface 12 is covered by the coating portion 20, and it is more preferable that the entirety of the side surface 12 is covered by the coating portion 20. In particular, if the coating portion 20 is provided continuously on the side surface 12, it is advantageous for preventing the coating portion 20 on the side surface 12 from coming off, in comparison to the case where the coating portion 20 is provided intermittently thereon.

In the present embodiment, a region of 80% or more of the bottom surface 16 of the core portion 10 is exposed without being covered by the coating portion 20 as well. Accordingly, the liquid can reach the core portion 10 through the exposed portions of the two bottom surfaces 14 and 16, and therefore the water-absorptivity of the water absorption treatment material 1 can be further improved. From the viewpoint of improving the water-absorptivity of the water absorption treatment material 1 in this manner, it is preferable that a region of 90% or more of the bottom surface 16 is exposed without being covered by the coating portion 20, and it is more preferable that the entirety of the bottom surface 16 is exposed without being covered by the coating portion 20.

Incidentally, the used water absorption treatment material 1 needs to be disposed of, and convenience for the user is increased if disposal can be performed by flushing the water absorption treatment material 1 in a flushing toilet. In order to perform disposal by thus flushing in a flushing toilet, it is required that the water absorption treatment material 1 has sufficient water-solubility (a property in which bonded fibers and particles rapidly separate and dissolve in water due to coming into contact with water).

In this respect, the conventional water absorption treatment material has had a problem in that the core portion is covered by the coating portion, which incurs a decrease in water-absorptivity as well as a decrease in water-solubility. This is because the coating portion blocks the water of the flushing toilet from reaching the core portion. In the present embodiment, the majorities of the bottom surfaces 14 and 16 are exposed as described above, and therefore this problem can be solved.

If the adhesive material contained in the coating portion is a water-absorptive polymer, the problem of the decrease in water-solubility of the conventional water absorption treatment material is prominent. This is because water-absorptive polymers have a property of expanding during liquid absorption, and when the water-absorptive polymer swells in the coating portion, the water of the flushing toilet is further prevented from reaching the core portion. For this reason, in such a case, a water absorption treatment material 1 that can prevent a decrease in water-solubility is particularly useful.

Regarding the method for manufacturing the water absorption treatment material 1, in the core portion forming step, the core portion 10 is formed through extrusion granulation. Accordingly, the approximately circular column-shaped core portion 10 can be obtained easily.

The coating portion forming step includes a cutting-off step of cutting off the end portions of the core portion 10 after the coating material 22 is attached. Accordingly, the coating portion 20 with the above-described configuration can be obtained easily. Also, due to the cutting-off step being provided in this manner, the coating portion 20 that partially covers the core portion 10 can ultimately be obtained even if the coating material 22 is attached to the entire periphery of the core portion 10. In actuality, in the present embodiment, the coating material 22 is attached to the entire periphery of the core portion 10. For this reason, there is an advantage in that the coating material 22 can be attached to the core portion 10 without using a special apparatus or method.

Figure 6:
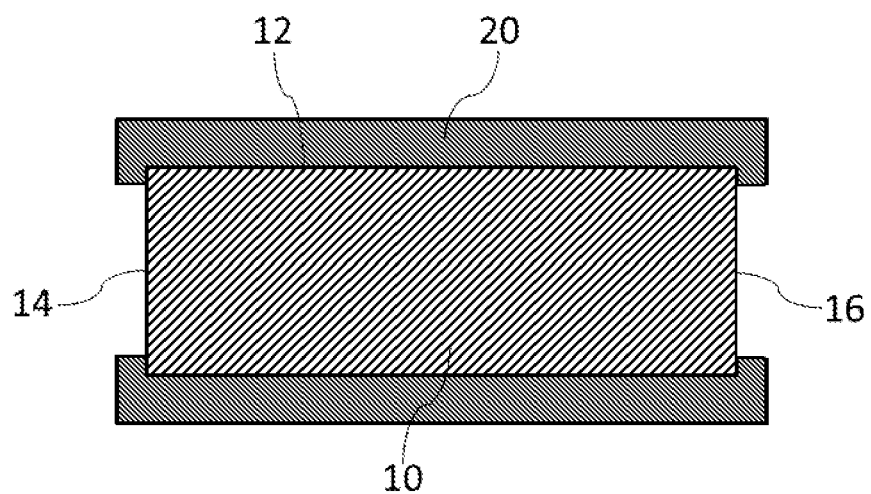
FIG. 6 is a cross-sectional view illustrating a configuration of a coating portion according to a modified example.

The present invention is not limited to the above-described embodiment, and various modifications are possible. In the above-described embodiment, if the coating portion 20 is provided on part of the bottom surface 14, as shown in FIG. 6, it is preferable that the boundary between the side surface 12 and the bottom surface 14 is covered by the coating portion 20. In other words, it is preferable that the coating portion 20 provided on the side surface 12 and the coating portion 20 provided on the bottom surface 14 are continuous at the boundary. Accordingly, the coating portion 20 can be made less likely to come off. Similarly, regarding the case in which the coating portion 20 is provided on part of the bottom surface 16, it is preferable that the boundary between the side surface 12 and the bottom surface 16 is covered by the coating portion 20.

The above-described embodiment illustrated a case in which exposed portions are present on the two bottom surfaces 14 and 16 of the core portion 10. However, the exposed portion may be present on only one of the bottom surface 14 and the bottom surface 16 of the core portion 10. In this case, in the cutting-off step, it is sufficient to cut off only one end portion of the core portion 10.

The above-described embodiment illustrated a case in which the coating portion 20 is formed by executing the cutting-off step after the attachment step. However, providing of the cutting-off step is not essential. In the attachment step, the coating portion 20 may be formed by attaching the coating material 22 in a concentrated manner on the side surface 12. For example, the coating material 22 can be attached in a concentrated manner on the side surface 12 by spraying the coating material 22 onto the core portion 10 from directly above, in a state in which the core portion 10 is laid on a belt conveyor that flows horizontally. At this time, by causing the belt conveyor to shake, the core portion 10 is rotated about its central axis, and thus the coating material 22 is more easily attached to the entirety of the side surface 12.

LIST OF REFERENCE NUMERALS

1 Water absorption treatment material
10 Core portion
12 Side surface
14 Bottom surface (first bottom surface)
16 Bottom surface (second bottom surface)
20 Coating portion
22 Coating material

The invention claimed is:

1. A water absorption treatment material comprising:
 a circular column-shaped core portion that is water absorbent and has a side surface and first and second bottom surfaces; and
 a coating portion that covers the core portion,
 wherein:
  an entirety of the side surface of the core portion is covered by the coating portion, and
  an entirety of the first bottom surface of the core portion is exposed without being covered by the coating portion.

2. The water absorption treatment material according to claim 1,
 wherein a region of 80% or more of the second bottom surface of the core portion is exposed without being covered by the coating portion.

3. The water absorption treatment material according to claim 1,
 wherein a boundary between the side surface and the second bottom surface is covered by the coating portion.

* * * * *